April 7, 1964    O. C. HERSHBERGER ET AL    3,127,631
WAX APPLICATOR
Filed Aug. 18, 1961          2 Sheets-Sheet 1
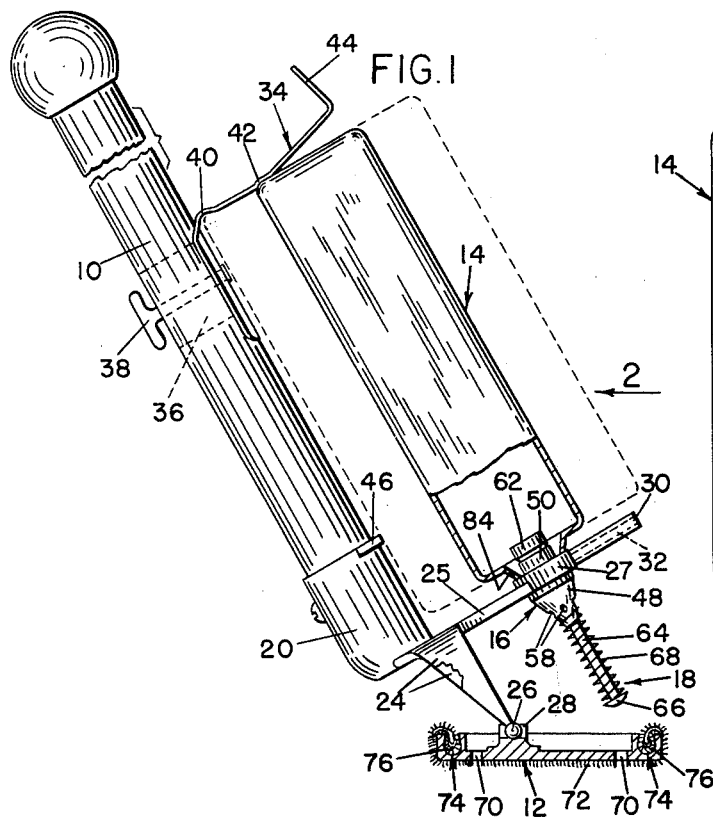
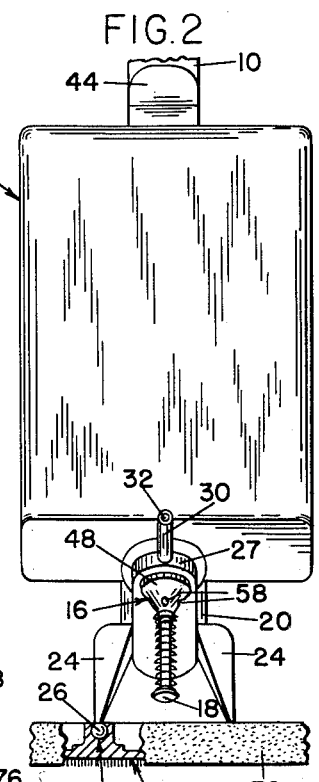
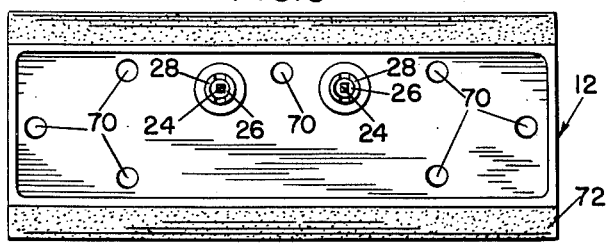
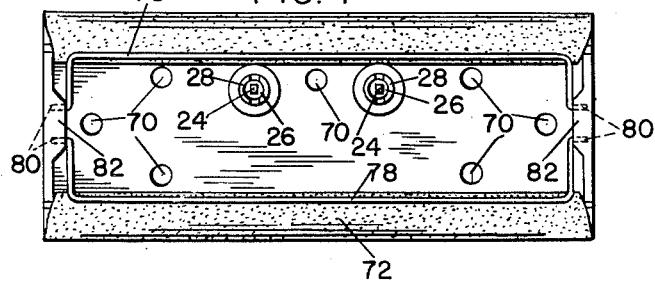
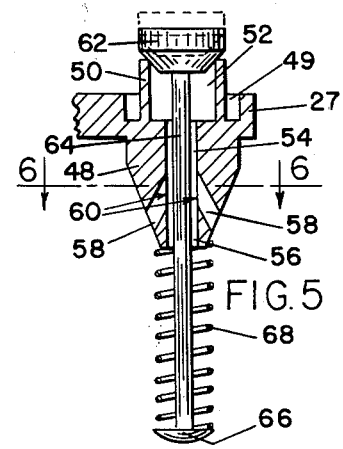
INVENTORS
OLIN C. HERSHBERGER
DOLORE MORIN
ATTORNEY April 7, 1964   O. C. HERSHBERGER ET AL   3,127,631
WAX APPLICATOR Filed Aug. 18, 1961   2 Sheets-Sheet 2

INVENTORS
OLIN C. HERSHBERGER
DOLORE MORIN

ATTORNEY

United States Patent Office 3,127,631
Patented Apr. 7, 1964

3,127,631
WAX APPLICATOR
Olin C. Hershberger and Dolore B. Morin, both of
Box 8, Thompson, Conn.
Filed Aug. 18, 1961, Ser. No. 132,442
1 Claim. (Cl. 15—588)

This invention relates to a new and improved wax applicator particularly adapted for waxing floors and similar surfaces, and the principal object of the invention resides in the provision of a wax applicator including a wax spreader plate and a valve arranged on a pusher handle in cooperative relation to the plate in such a way as to provide for automatically applying wax from a commercial container directly to the plate, the container being removably mounted on the handle in position to be opened and closed by the valve upon a swinging motion of the handle, said valve being positioned with respect to the opening of the container in such a way as to cause wax to issue from the container, said handle being provided with means for holding the container in upside down relationship with the opening or mouth of the container and in close association with the valve.

Other objects of the invention include the provision of an automatic applicator for wax as above described and including means for holding different sizes of wax containers in operative relationship with respect to said valve; the provision of a new and improved waxing pad holder plate or spreader member including means for detachably connecting the handle to the spreader and said valve having means for engaging the spreader for actuation of the valve upon proper manipulation of the handle; and means for holding a pad to the spreader member plate, said means including undercut grooves at each side of the spreader member plate to receive fold-over edges or seams at the edges of the pads, and alternatively means including pivoted bails or the like for the purpose of holding the edges of the pad on the wax spreader plate.

An object of a non-elected species of the invention includes the provision of a modified type of device in which the valve construction is substantially the same but is mounted directly under and in cooperative relationship with respect to said handle, the handle being hollow and filled with wax.

The invention further relates to arrangements and combinations of parts which will be hereinafter described and more particularly set forth in the appended claim.

Reference is to be had to the accompanying drawings, in which:

FIG. 1 is a view in side elevation with parts in section and illustrating the invention;

FIG. 2 is a view in front elevation thereof, looking in the direction of arrow 2 in FIG. 1;

FIG. 3 is a top plan view of one form of the pad;

FIG. 4 is a top plan view of another form of pad holder, parts being broken away;

FIG. 5 is a sectional view on an enlarged scale showing the construction of the valve;

Figure 6:
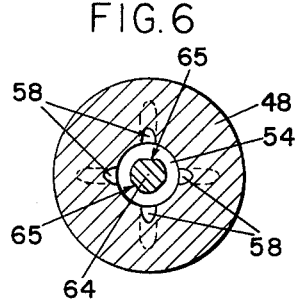
FIG. 6 is an enlarged section on line 6—6 of FIG. 5.

In general, the device comprises a handle 10 which is usually elongated and is in the nature of a pusher. There is an apertured wax spreader plate generally indicated at 12 which is detachably connected with respect to the handle 10 and receives wax on the top surface thereof from a commercial container which is indicated generally at 14. The wax is distributed by the spreader plate and a pad which is held thereon and is received on the plate from the container 14 by means of a special new and improved valve mechanism generally indicated at 16. This valve is in close cooperative relationship with respect to the commercial wax container which can be applied to the device quickly and easily.

The valve 16 is normally closed and in order to open it so that wax will run from the container 14 onto the top of the plate 12, it is only necessary to move the handle 10 in a clockwise direction from its normal operating spreading condition which is indicated in FIG. 1, to cause a valve stem actuator 18 to come to rest or impinge against the top surface of the spreader plate 12 and to be moved thereby to open the valve so that the wax will run down through the valve onto the plate 12, and when the handle 10 is moved back to the FIG. 1 position, the valve is automatically closed.

Figure 7:
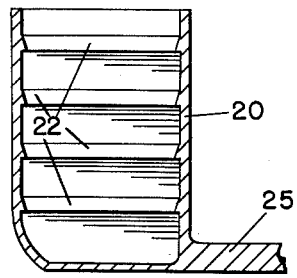
FIG. 7 is an enlarged sectional view illustrating the construction of the handle holding device.

A thimble or the like 20 is utilized to receive the handle 10. As shown in FIG. 7, the thimble 20 is provided with inwardly directed relatively sharp edged annular rings 22. These rings are reversely tapered as shown and facilitate the entry of the handle 10 into the thimble 20 but resist its extraction. All of the parts of the device except the handle 10 are preferably made of molded plastic and with a little cement applied in the thimble 20, the handle 10 will be firmly held in the thimble 20, whether it is made of wood or hollow tubing, etc.

At the lower end of thimble 20 there is provided a pair of legs 24, 24, each of which is provided at its lower end with a ball 26 for a snap-in detachable connection with relation to a socket 28 formed as a part of the spreader plate 12.

Between the legs 24, 24, there is provided a relatively elongated or outstanding support 25 which extends into a circular portion 27 being a part of and holding the valve parts. At the opposite side of the portion 27 from the extension 25 there is a further extension 30 which is provided with a hanger hole 32 therein.

The handle 10 is provided with a leaf spring generally indicated at 34 and this is longitudinally adjustably mounted on handle 10 as by the use of a fastener in a slot 36 or a series of holes, secured in position by a thumbscrew 38. The spring 34 is provided with two steps or the like which are indicated at 40 and 42 and also it has a release fingerhold 44. The reason for the two steps is to provide for holding two different sizes of containers, one of which is shown in solid lines in FIG. 1 and the other in larger size being shown in dotted lines. The valve-holding part at 27 is arranged in such a way as to provide for servicing the larger container as well as the small container, and it will be noted that the solid line positioning of container 14 is indicated as spaced from handle 10 while in operation but the larger size container will be closely adjacent the handle 10 and actually engaging a flat transverse projection 46 which may be arranged on the thimble 20 as shown.

The valve construction itself is perhaps best shown in FIGS. 5 and 6. It comprises a valve housing 48 which is conveniently made of molded plastic. This valve housing 48 has a part thereof the valve-holding part 27 shown in FIG. 1. In the part 27 there is an annular groove 49 which receives the lip of the commercial container 14 as it is indicated in FIG. 1 at 84. Inwardly with respect to groove 49 there is an annular collar 50 which rises up somewhat above the part 27 and this collar is adapted to receive the wax from the commercial container. The interior of the collar 50 is open, forming a chamber 52 which is in communication with a through passage 54 in the housing 48. Passage 54 extends all the way from chamber 52 to the orifice at 56. The valve housing 48 is preferably in the shape of an inverted truncated cone and is provided with a series of openings 58 which extends upwardly from the surface of the cone in a slanting direction inwardly to communicate with passage 54. The wax flows freely outwardly through these openings, it being noted that by running the openings or passages 58 in a slanting direction, relatively enlarged wax-receiving surfaces are provided as at the openings 60 between passage 54 and each of passages 58.

The top opening of the chamber 52 is closed by means of a rubber-like valve member 62 which preferably has a portion in the shape of an inverted cone as shown and to which is attached a valve stem 64 extending through passage 54 and well outwardly beyond orifice 56, terminating in a head 66 forming one abutment for a valve spring 68, the other abutment of which is found against the truncated lower end of the conical shaped valve housing 48. It will be seen that by this construction the valve is normally closed but may be opened by an upward thrust on the head 66 of the valve stem 64 to the dotted line position shown in FIG. 5.

When the handle is tilted so as to release the wax to flow onto the plate 12, the same will be distributed over the surface of the plate which is apertured here-and-there as at 70 to allow the wax to flow therethrough. There is a spreader pad 72 on the plate. The wax of course passes through the pad and the handle 10 is then manipulated to distribute the wax over the floor.

In one form of spreader plate 12, the same is provided with upper, undercut longitudinal side edged grooves 74 which are adapted to receive and hold the rolled-over or beaded edges 76 of the pad 72.

In the form of the spreader plate which is shown in FIG. 4 the plate may be generally the same and holds the device in the same way but in this case instead of providing undercut grooves 74, spring bails 78 may be utilized to hold the edges of the pad 72, these bails being pivoted by out-turned ends 80 in enlargements 82 in the end walls of the spreader plate.

The valve stem 64 has a very loose fit in the passage 54 so that it may wobble from side-to-side so as not to become stuck. Also this facilitates the flow of the wax down through passage 54 and to further enhance this action, the valve stem 64 may be provided with flats as at 65 as clearly shown in FIG. 6.

It is believed that the operation of the new wax spreader will be clear from the above description. A commercial container of wax 14 is opened and is applied to the device by inserting the usual neck or lip 84 of the container 14 to enter the groove 49 substantially filling the same. Of course the container 14 is applied in upright condition, with the handle 10 being inverted. The spring 34 is adjusted to receive the bottom of the container which is usually indented and the bottom of the container 14 is snapped into and held by the spring. The device is then inverted to the FIG. 1 position and by oscillation of the handle 10 wax flows onto plate 12, and the handle 10 is then used for spreading the wax over the floor. Whenever more wax is needed, the handle 10 is oscillated again as described.

Figure 8:
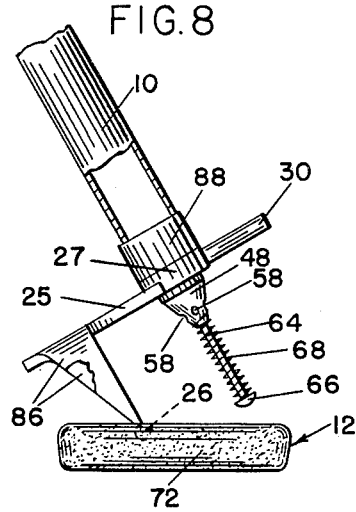
FIG. 8 is a view in side elevation showing a non-elected species of the invention.

In the non-elected species of the device as shown in FIG. 8, no provision is made for holding a container of wax but instead of the bracket comprises legs 86, 86 which are the same as those at 24 and it holds the valve housing 48 in the same way by means of the enlargement at 27 but in this case the part 27 instead of terminating below the wall 50, see FIG. 5, extends well above the same as at 88 and receives the lower end of the tubular hollow handle 10 therein. The hollow handle 10 can then be filled with wax which is in communication with the valve construction which is exactly the same as before and used the same way.

This application has been disclosed as pertaining to an applicator for wax but of course it is to be understood that any other material which may be suitably dispensed and spread other than wax, is also included in respect to the use of the device.

Having thus described our invention and the advantages thereof, we do not wish to be limited to the details herein disclosed, otherwise than as set forth in the claim, but what we claim is:

A wax applicator and spreader comprising an elongated handle, a bracket attached to said handle at one end thereof and extending at right angles thereto, a wax spreading plate, means pivotally mounting the spreader plate on the bracket, the spreader plate extending generally normal to the handle, the handle being located generally centrally thereof, the spreader plate being relatively elongated in a direction transverse to the handle, apertures through the spreader plate, said apertures being generally scattered throughout the same, a valve substantially permanently mounted on the bracket, said valve being located vertically over the spreader plate adjacent the center portion thereof, a separable container for the wax to be spread, said container including a pouring lip, means on the bracket receiving the pouring lip and centering the same with respect to said valve, means to open the valve to allow wax to descend by gravity from the container onto the spreader plate and means normally holding the valve closed, said valve opening means comprising a movable stem extending toward the spreader plate and being moved to valve open position by contact with the spreader plate as the handle is actuated to oscillate the same with the bracket, valve, and container as a unit relative to the spreader plate, the wax released by the valve being deposited on the spreader plate and running through the apertures in the spreader plate to be distributed generally evenly over the entire area of the spreader plate.

References Cited in the file of this patent

UNITED STATES PATENTS

| 2,000,167 | Forman | May 7, 1935 |
| 2,106,280 | Sandhop | Jan. 25, 1938 |
| 2,489,162 | Schulman | Nov. 22, 1949 |
| 2,566,429 | Schulman | Sept. 4, 1951 |
| 2,799,880 | Zahn | July 23, 1957 |
| 2,876,476 | Woods | Mar. 10, 1959 |

FOREIGN PATENTS

| 139,281 | Australia | Nov. 2, 1950 |
| 829,204 | Germany | Feb. 11, 1952 |